United States Patent [19]

Plamper et al.

[11] Patent Number: 5,410,867
[45] Date of Patent: May 2, 1995

[54] MOWER DECK

[75] Inventors: Gerhard Plamper, Valley City; Nick E. Ciavarella, Cleveland, both of Ohio

[73] Assignee: MTD Products Inc., Cleveland, Ohio

[21] Appl. No.: 129,457

[22] Filed: Sep. 29, 1993

[51] Int. Cl.⁶ .............. A01D 34/68; A01D 34/73; A01D 34/82

[52] U.S. Cl. .................. 56/320.2; 56/2; 49/386

[58] Field of Search ............ 56/320.1, 320.2, 203, 56/194, 202, 2; 49/386, 383

[56] References Cited

U.S. PATENT DOCUMENTS 3,608,291  9/1971  Kidd ........................ 56/320.1
3,706,190  12/1972  Taub ........................ 56/320.2 X
4,726,178  2/1988  Mallaney et al. ......... 56/320.2 X
4,854,115  8/1989  Jones et al. .............. 56/320.1
4,897,988  2/1990  Schweitz ................. 56/320.2 X
5,210,998  5/1993  Hojo et al. ............... 56/320.1 X

FOREIGN PATENT DOCUMENTS 3007376  9/1980  Germany ................. 56/320.2

Primary Examiner—Stephen J. Novosad
Attorney, Agent, or Firm—Lightbody & Lucas

[57] ABSTRACT

A convertible mulching mowing deck is disclosed having an angled top profile with maximum height at a discharge hole plugged with a spring loaded plug, with the sidewall of the deck recessed outwards at the back edge of the discharge hole.

11 Claims, 4 Drawing Sheets

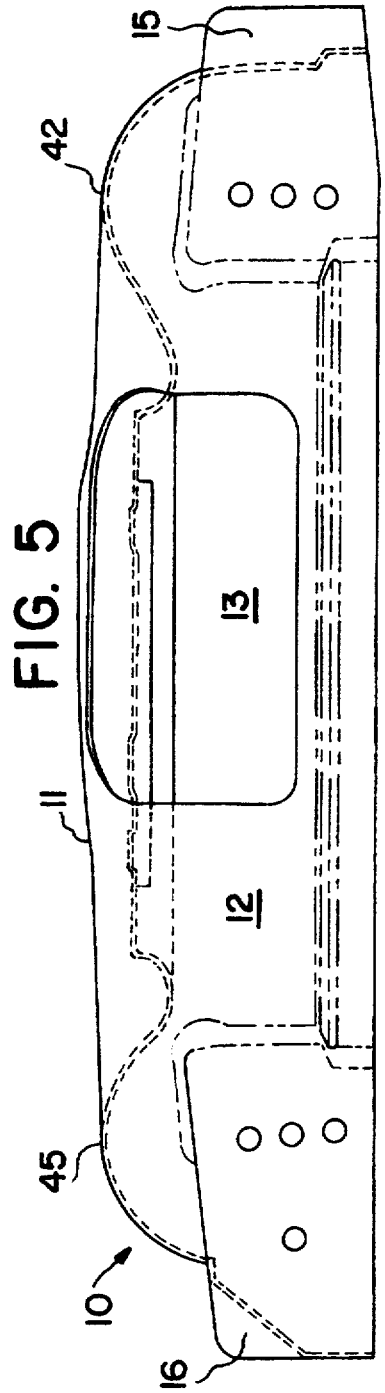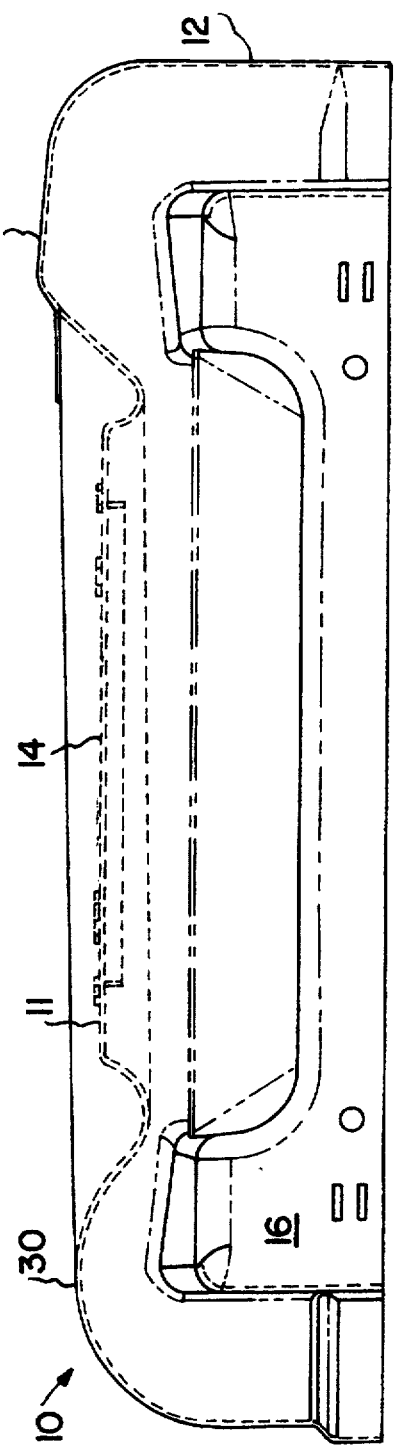

MOWER DECK

FIELD OF THE INVENTION

This invention relates to a mower deck for rotary lawn mowers and, more particularly in the preferred embodiment, to a single bladed mulching lawn mower.

BACKGROUND OF THE INVENTION

Rotary deck lawn mowers have been in use for a significant time. Typically, these rotary deck lawn mowers have a housing supported directly or indirectly by wheels to the ground. An engine mounted to or neighboring the top of the deck provides power for the rotating cutting blades on the underside thereof. As the mower moves over the ground, the rotating blades cut the grass which creates clippings. Customarily, these clippings are discharged through a discharge chute for either collection in a mounted bag or side discharge dispersion over the surface of the grass. In recent times, more and more mowers have the capability of mulching the clippings, that is, cutting them into small enough pieces such that they can be deposited on the grass directly under the lawn mower to act as an organic mulch. Some of these mulching mowers have the optional capability of also bagging the grass clippings through some sort of operable shuttered door. Some mulching mowers are also capable of optional side discharge.

OBJECTS AND SUMMARY OF THE INVENTION

It is an object of the present invention to provide for a convertible mulching mower deck.

It is another object of the present invention to simplify the operation of a convertible mulching deck.

It is yet another object of the present invention to increase the efficiency of a convertible mulching mower deck.

It is still another object of the present invention to simplify the process of converting a mulching mower deck from mulching to bagging the clippings or to side discharge.

It is a further object of the present invention to increase the service life of convertible mulching decks.

It is yet a further object of the present invention to increase the efficiency of bagging in a convertible mulching mower deck.

Other objects and a more complete understanding of the invention may be had by referring to the drawings in which:

BRIEF DESCRIPTION OF THE DRAWINGS

The structure, operation, and advantages of the presently disclosed preferred embodiment of the invention will become apparent when consideration of the following description taken in conjunction with the accompanying drawings wherein:

FIG. 5 is a sideward, partial cross sectional view of the mulching deck of FIG. 1 taken substantially from lines 5—5 in FIG. 2; and, FIG. 6 is a back end partial cross sectional view of the mulching mower taken substantially from lines 6—6 in FIG. 2.

DETAILED DESCRIPTION OF THE INVENTION

Figure 1:
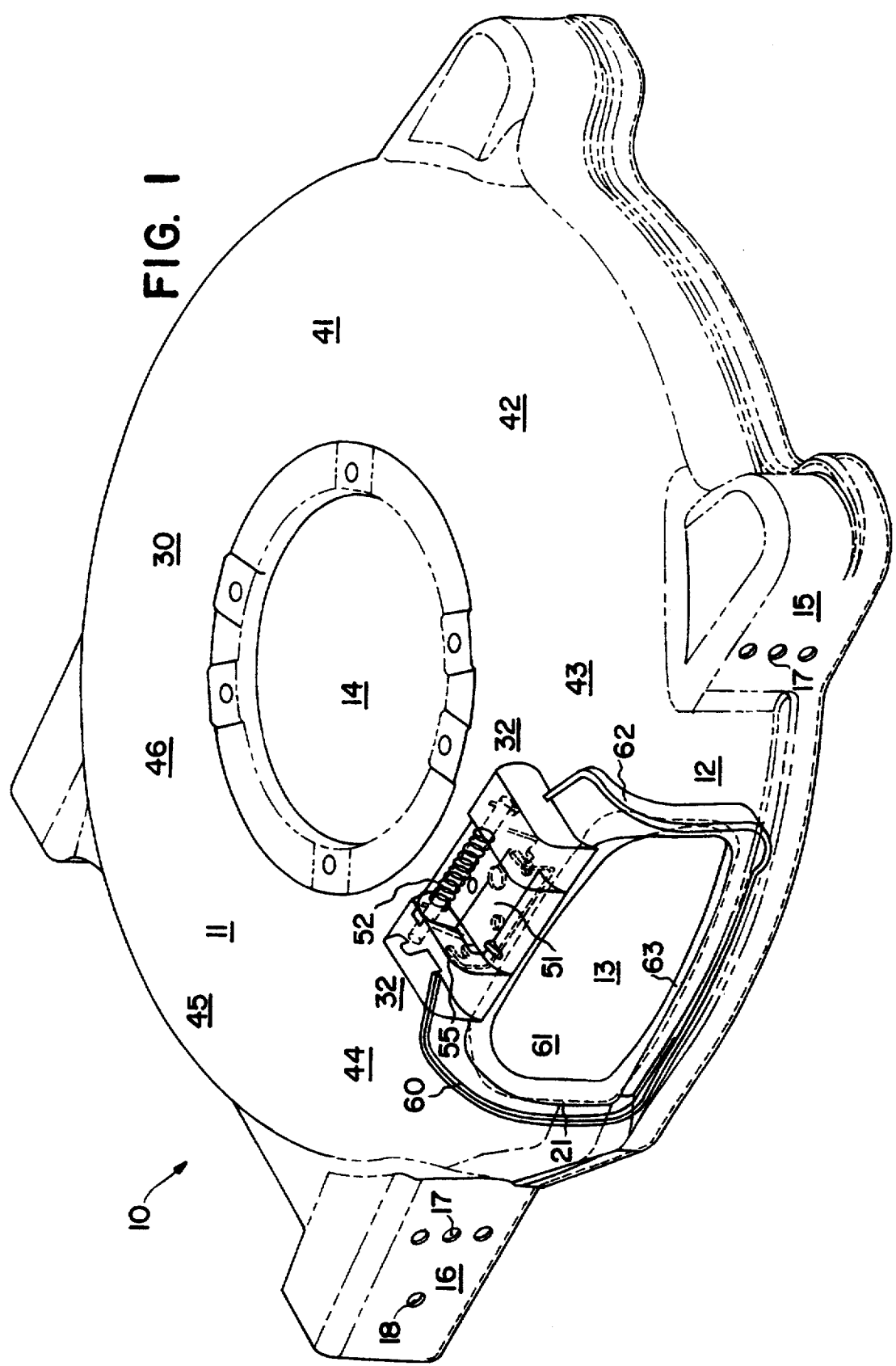
FIG. 1 is a perspective view of a single blade mowing deck incorporating the invention of the application.

The invention relates to an improved mower deck 10. The particular mower deck 10 disclosed includes a substantially circular top surface 11 having a downwardly extending side wall 12. A central circular hole 14 is located in the center of the top surface 11 so as to provide for a mounting location for the engine which is not shown. Fore and aft extending wheel mount brackets 15, 16 extend off of the mower deck 10. These wheel mount surfaces 15, 16 allow for the bearing interconnection of four wheels to the mower deck 10 at the corners thereof so as to support the same for travel over the ground. In the particular embodiment shown, the height of the wheels are adjusted by selectively bolting the axles into the holes 17 in the fore and aft wheel mount surfaces 15, 16. This allows for a range of approximately 1.5" height adjustment for the mowing deck.

The handlebars (not shown) for the mowing deck extend angularly upwards from handle brackets located in the aft wheel mount bracket 16. The handlebars allow the user to selectively control the speed and direction of the travel of the mower deck 10 over the surface.

The invention of the present application relates to the shaping of the mower deck 10 such to optimize the mulching action of such deck. The differences include the shaping of the top surface 11 of the mower deck and the shaping of the side wall 12 of the mower deck together with the synergistic cooperation therebetween.

The inner surface of the bottom of the sidewall 12 is circular, generally following the arc of the tip of the mowing blade, spaced approximately ⅛" therefrom. This maximizes the air circulation of the mowing blade by reducing inefficient spillage or eddies under the mowing deck.

In a traditional convertible mulching mower deck, the top surface 11 of the mower deck has a relatively uniform rounded appearance throughout the 360° extent of such mower deck. In contrast, in the preferred embodiment of the present invention, the height of the top surface 11 of the mower deck 10 varies continually throughout its circumference from a low area 30, 180° opposed from the hole 13 in the side wall 12 to a high area 32 immediately adjacent to such hole 13. In the preferred embodiment disclosed, the increase in height from the low area 30 to the high area 32 is approximately 14%. The height of the top surface 11 from the bottom plane of the mower deck 10 in the particular embodiment is: the height at 30 is 4.436" the height at 41 is 4.569" the height at 42 is 4.724" the height at 43 is 4.846" the height at 32 is 4.846, the height at 44 is 4.691" the height at 45 is 4.596" and the height at 46 is 4.478".

When the mower deck 10 is used in its mulching capacity, the rising height from the low area 30 to the high area 32 alleviates pressure at the point of cut, thus allowing for the efficient collection of the grass clippings into the mulching stream. The reason for this is the area in the front 180° of the mower deck 10 immediately behind the forward wheel mount surface 15 is the area where the majority of the cutting action of the mower takes place. By ever increasing the cross section under the deck in this area, the increasing volume of grass clippings is accommodated. The reducing cross section between the high area 32 and the low area 30 in the aft 180° section of the mower constricts air flow to concentrate the grass clippings, thus aiding in the recirculation of the grass clippings downward to be cut and recut by the rotating lawn mower. As there is less active original cutting in this area, the reducing cross section has only a minor effect on the overall efficiency of the mowing operation. The angling of the top surface 11 of the mower deck 10 thus facilitates both the cutting and the mulching aspects of the mower.

When the mower deck 10 is used in its bagging or side discharge dispersal mode, the rising profile from the low area 30 to the high area 32 allows the grass clippings as cut to be uniformly dispersed in a high velocity air stream. The grass clippings are also encouraged to flow in a generally upward direction towards the hole 13 by this increasing height top surface 11. This tends to throw grass clippings with more force and farther out in side discharging. The decreasing section after the hole 13 in the side wall 12 of the mower deck 10 works to aid in equalizing the pressure under the mower deck in compensation for the volume of air which is discharged with the clippings out of the hole 13 whether to a bag or open side discharge. The declining area from the hole 13 to the low area 32 also encourages the maintenance of a high velocity cyclone of air beneath the mower deck 10, thus increasing the efficiency of the side discharge dispersal and/or bagging procedure.

The conversion between a mulching deck to a side discharge dispersal or bagging deck is accomplished through the use of a movable mulching plug 60 positioned to fit within to the hole 13 in the side wall 12. The mulching plug 60 shown is hinged and spring loaded downwards by heavy torsion spring 52, in the particular embodiment shown, with five pounds of force measured at the bottom of the plug. No lock is utilized in the preferred embodiment.

The deck in its default condition is a mulching deck. As such, no action need be taken by the operator to provide for a mulching action.

Figure 2:
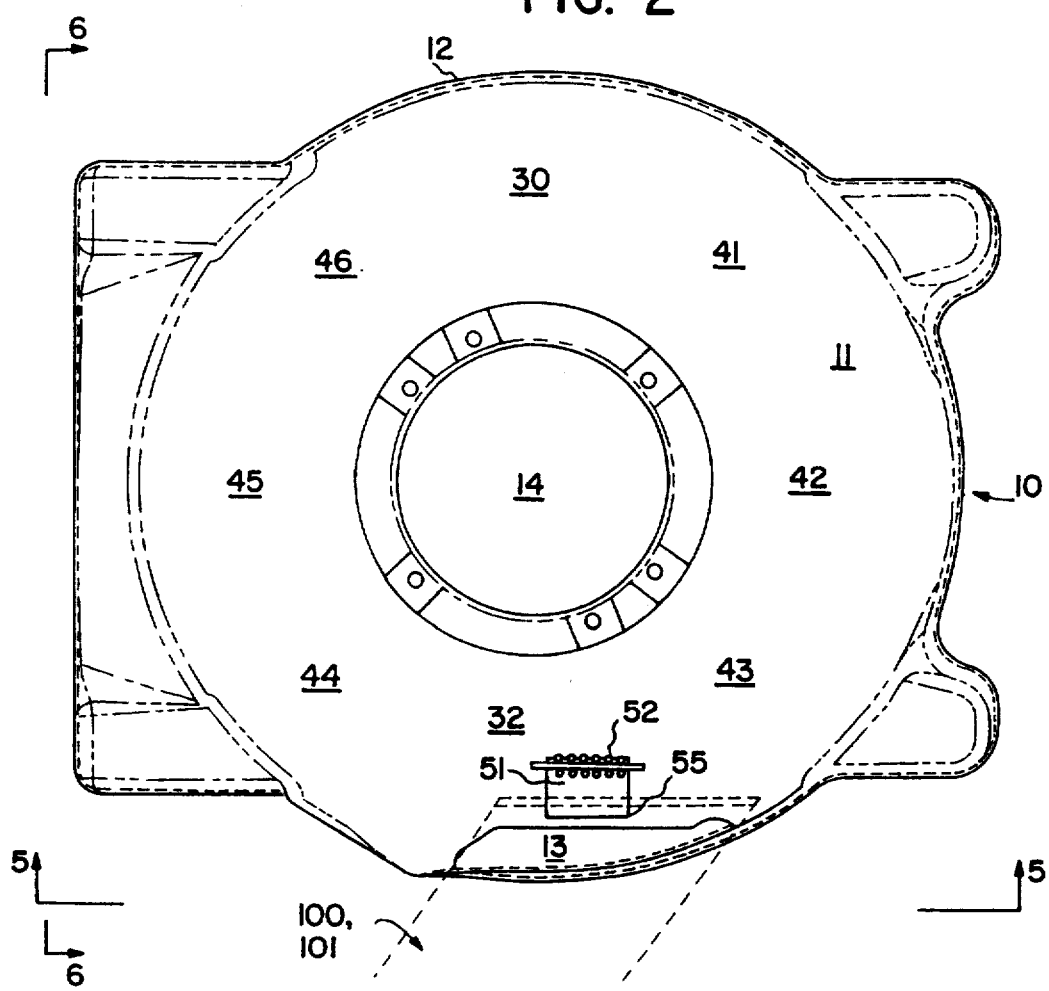
FIG. 2 is a downward view of the mulching deck of FIG. 1 showing a discharge/entrance chute attached.

To convert the deck to a bagging deck, the operator moves the plug 60 upwards against spring pressure and hooks the entrance chute 100 to the clipping bag onto the hooks 55 (later described) uncovered by the movement of the plug 60. Thereafter, the plug 60 is retained in an open position by the chute 100 with all clippings passing down the entrance chute to be bagged. The chute 100 is shown in representational form in FIG. 2 (plug 60 removed for clarity).

To convert the deck to a side dispersal deck, the operator again moves the plug 60 against the spring pressure and hooks a discharge chute 101 onto the hooks 55 uncovered by the movement of the plug 60. Again, thereafter, the plug 60 is retained in its open position by the chute 101 with all clippings passing down the entrance of the discharge chute to be sideways dispersed (see FIG. 2).

If either chute 100, 101 is not present, or falls off, the deck automatically defaults to a mulching mode without any operator action. No active operator action is necessary for the conversion, and no active lock necessary to retain the plug 60 in any particular mode. In addition, since the plug 60 is physically attached to the deck at all times, the plug 60 will not be misplaced or lost by the user.

The mulching plug 60 is designed with a central inner section 61 which fits into the hole 13 and an outer flange 62 which rests generally on the exterior surface of the side wall of the mower deck 10.

The inner section 61 of the plug 60 is designed to have a profile generally matching the profile of the inner surface of the mower deck 10 except as discussed below. It is preferred that the inner surface of the inner section 61 of the plug 60 extends slightly further into the mower deck than the side wall 12 at least at the trailing edge of the hole 13. This protects the trailing edge of the hole 13 from physical damage. It also means that the plug 60 must be displaced by this additional distance before any discharge can occur.

In the particular embodiment disclosed, the side wall has the thickness of approximately 0.070" with the inner surface of the section 61 extending inwardly ⅛-¼" of the sidewall 12 at the leading edge of this hole 13 and 3/16-⅜" at the trailing edge of hole 13 (primarily due to the displacement of the sidewall 12 outwards at this trailing edge as later described). At its lower edge 63, the inner section 61 of the plug 60 is slightly but uniformly spaced from the spinning blade, preferably following the contour of the majority of the lower edge of the sidewall 12. The top edge 64 of the plug 60 is pivotally mounted to a bracket 51. A spring 52 extending between the bracket 51 and the plug 60 spring loads the plug 60 into a closed position in respect to the hole 13. When the plug 60 is in its open position, two hooks 55 are exposed. These hooks 55, opening towards the center of the mower deck 10, allow the entrance chute 100 to a grass bag (not shown) to be fixedly attached to the mower deck 10 adjoining the hole 13 to convert the deck 10 to a bagging deck. The part of the chute 100 adjoining the hooks 55 prevents the downward movement of the plug 60. In a similar manner, the side dispersal discharge chute 101 may be attached.

Figure 3:
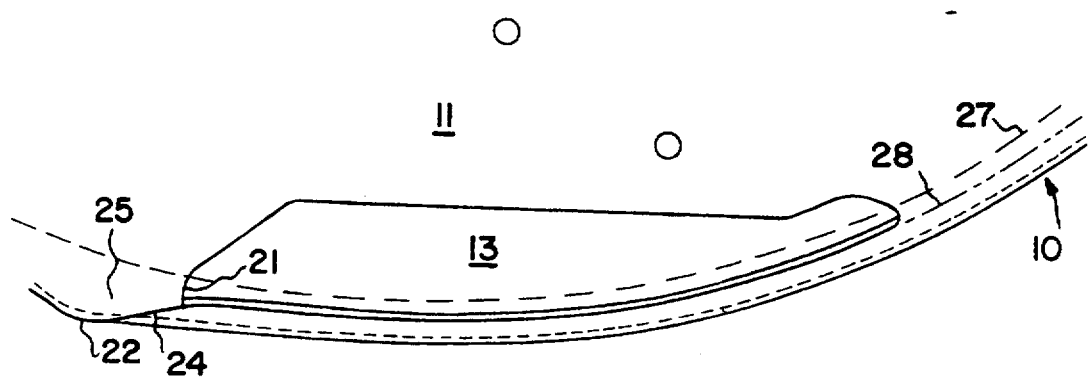
FIG. 3 is an enlarged partially cutaway view of the mulching deck of FIG. 2.
Figure 4:
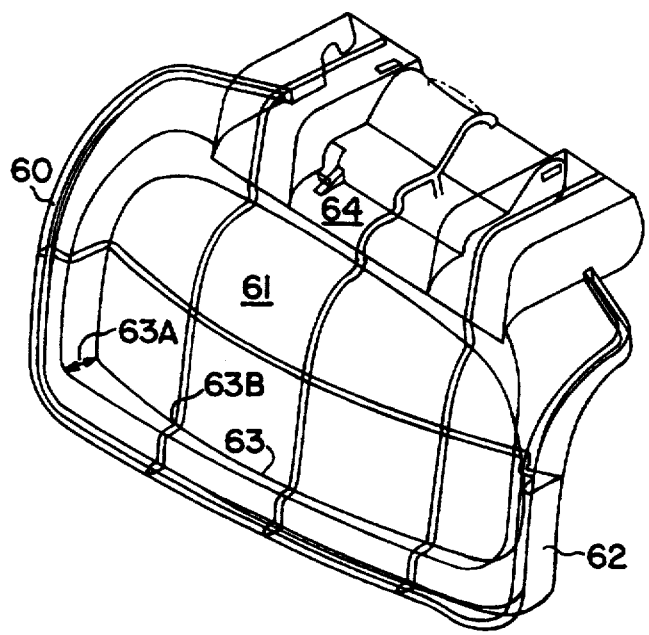
FIG. 4 is a perspective view showing contour of the door for the mulching deck of FIG. 1.

The shape of the side wall 12 immediately behind the hole 13 has been modified for use with the mulching plug 60. This is perhaps best understood in respect to the drawing of FIG. 3. In a conventional mulching deck, it is customary for the housing to have a generally uniform circular profile with the side walls uniformly spaced from the arc 27 traced by the tip of the rotating mower blade. In the preferred embodiment of the invention disclosed, the side wall 12 is displaced outwardly in respect to the rest of the deck beginning prior to the trailing edge 21 of the hole 13. This forms an outer deflecting surface 24 as well as an inner clearance space 25. The outer deflecting surface 24 causes objects that do make it pass the plug 60 in a mulching mode to be deflected to the side of the mower deck. (It also aids in directing the discharge tangentially outwards in a side discharge dispersal mode wherein the plug 60 is locked upwards with the hole 13 unobstructed as herein described.) The inner clearance 25 increases the distance, the 63a distance, that the plug 60 must be moved outward before any objects can pass out of the hole. In the preferred embodiment disclosed, the displacement outward occurs at point 63b for approximately 2" from the trailing edge 21 of the hole 13 with the maximum outward positioning occurring at a point 22 approximately 1.3" beyond the trailing edge 21 of the hole 13. This outward point is displaced approximately 0.7" outward from the customary profile 28. With this combination of the shaping for the inner section 61 of the plug 60 and the displacement outward of the side wall 12, the plug 60 needs to be displaced approximately ⅜"

outward from its closed, at rest position prior to allowing any material to be accidentally dispersed outwardly when the mower deck is in a mulching mode.

Further the spring 52 absorbs energy from internal objects by absorbing any outward forces. This serves to aid in retaining objects under the deck in a mulching mode as well as minimizing damage to the mower. It also lowers any exit speed if the object is somehow discharged. Since the side wall 12 is angled outward beginning at the trailing edge 21 of the hole 13 to form a deflecting surface 24, this causes any debris which is discharged through the hole 13 to be dispersed radially outwardly of the mower deck 10. (This is instead of tangentially backwards behind the mower deck 10.) This is also useful when the deck is used in a side discharge dispersal mode with the plug 60 locked in an upwards position leaving the hole 13 totally unrestricted.

In the preferred embodiment, this surface 24 of the side wall 12 is angled at approximately 12° in respect to a line parallel to a line drawn through the point 21 parallel to the fore and aft longitudinal axis of the mower deck 10. This surface 24 extends for approximately 1.3" behind the trailing edge 21 of the hole 13 before the sidewall 12 begins angling inward to again join the customary circular sidewall profile 28. The shape of the mowing deck side wall 12 aft of the hole 13 eliminates the necessity of having a separate lock to hold the plug 60 in its closed position. For this reason, it is not necessary for the ultimate consumer to remember an additional operating step (if not obvious) when converting from a bagging or side discharge to mulching function.

Although the invention has been described in its preferred embodiment with a certain degree of particularity, it is to be understood that numerous changes can be made without deviating from the invention as hereinafter claimed. For example, the preferred embodiment is a single blade push rotary mower. The invention could also be utilized with a multiple blade tractor powered mowing deck. Additional example, the preferred embodiment uses a top pivoting plug. The plug could be pivoted elsewhere, be otherwise movable, or even be completely removable. Further example, the deflecting surface 24 could be provided by a separate bracket welded or otherwise attached to the deck 10 instead of being formed integrally thereto.

What is claimed:

1. An improved shape for a mower deck having a top surface with a front 180° section and an aft 180° section and a side wall for use with a rotating blade, the improvement comprising the top surface of the mower deck being symmetrically angled in both the front 180° section and the aft 180° section from a low area on one lateral side of the mower deck to a high area on the other lateral side of the mower deck, said low area being located on the side of the mower deck that has forward blade rotation.

2. The improved mower deck of claim 1 characterized in that the side wall has a uniform diameter circular shape without an integral outwardly extending chute and by the addition of a hole in the side wall of the mower deck adjoining the high area, a movable plug, means to movably mount said movable plug in respect to said hole such that the movement of said plug in respect to said hole converts said mower deck into a bagging or dispersal side discharge lawn mower.

3. An improved shape for a mower deck having a top surface and a side wall for use with a rotating blade, the improvement comprising the top surface of the mower deck being angled from a low area on one lateral side of the mower deck to a high area on the other lateral side of the mower deck, said low area being located on the side of the mower deck that has forward blade rotation, a hole in the side wall of the mower deck adjoining the high area, said hole having a trailing edge, and said side wall being angled outward to an outermost point behind said trailing edge, a movable plug, means to movably mount said movable plug in respect to said hole such that the movement of said plug in respect to said hole converts said mower deck into a bagging or dispersal side discharge lawn mower.

4. An improved shape for a mower deck having a top surface and a side wall for use with a rotating blade, the improvement comprising the top surface of the mower deck being angled from a low area on one lateral side of the mower deck to a high area on the other lateral side of the mower deck, said low area being located on the side of the mower deck that has forward blade rotation, a hole in the side wall of the mower deck adjoining the high area, a movable plug, means to movably mount said movable plug in respect to said hole, said means to movably mount said movable plug including hinge means to hinge said plug at its top edge to the mower deck and spring means to spring load said plug to cover said hole whereby the pivoting of said plug from said hole converts said mower deck into a bagging or dispersal side discharge lawn mower.

5. The improved mower deck of claim 2 characterized in that said plug has an inner section and said inner section extending inwardly of the side walls of the mower deck.

6. An improved plug for a mower deck having a hole in the side walls thereof, said plug including an inner section, said inner section of said plug extending inwardly of the side walls of the mower deck, pivot means to mount said plug to the mower deck along an edge thereof, spring means to load said plug about said pivot point into a default condition closing the hole in the mower deck, said hole in said mower deck having a trailing edge, and said side wall of said mower deck being displaced outwardly behind said trailing edge of the hole.

7. The improved plug of claim 6 characterized in that the mower deck has a top surface, said top surface being angled from a low area on one lateral side of the mower deck to a high area on the other side of the mower deck, said high area being adjacent to said hole, and said low area being located on the side of the mower deck wherein the rotating blade has forward movement.

8. The improved mower deck of claim 6 characterized in that the side wall of the mower deck is angled outward at 5°-20° in respect to a line running through the trailing edge of the hole in the mower deck with said line being substantially parallel to the longitudinal axis of the mower deck.

9. An improved plug for a mower deck having a hole in the side walls thereof, said plug including an inner section having a trailing edge, the hole in the mower deck having a trailing edge, the side wall of the mower deck being displaced outwardly behind said trailing edge of the hole, and means to mount said plug to the mower deck covering the hole with said trailing edge of said inner section extending inwardly of the side wall of the mower deck.

10. An improved plug for a mower deck having a hole in the side walls thereof, said plug including an inner section, said inner section having a trailing edge, means to mount said plug to the mower deck covering the hole, said trailing edge of said plug extending inwardly of the side walls of the mower deck, the hole in the mower deck having a trailing edge, and the side wall of the mower deck being displaced outwardly behind said trailing edge of the hole.

11. The plug of claim 10 characterized in that said means to mount said plug to the mower deck includes a pivot.

* * * * *